Figure 1:
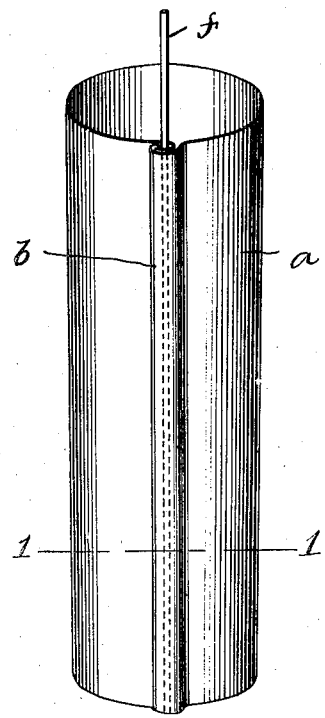

Aug. 18, 1925.

M. VERRON

BATTERY

Filed Aug. 8, 1924

1,550,188

Inventor:
Marcel Verron;
by
His Attorney.

Patented Aug. 18, 1925.

1,550,188

UNITED STATES PATENT OFFICE.

MARCEL VERRON, OF PARIS, FRANCE, ASSIGNOR TO GENERAL ELECTRIC COMPANY, A CORPORATION OF NEW YORK.

BATTERY.

Application filed August 8, 1924. Serial No. 730,968.

*To all whom it may concern:*

Be it known that I, MARCEL VERRON, a citizen of the French Republic, residing at Paris, France, have invented certain new and useful Improvements in Batteries, of which the following is a specification.

My invention relates to batteries and more in particular to batteries of that type known as dry batteries and in which a metal tube serves both as a negative electrode and as a housing for the electrolyte and for the other electrode.

Heretofore, the connecting wire for the tube has been soldered thereto. Sometimes the connecting wire has been attached by strongly pressing the wire to the tube by means of a suitable binding. These methods of attaching the wire require delicate work and sometimes cause the wire to be ripped off.

One of the objects of the invention is to form the tube with two of the edges folded, one over the other, which are pressed together to form a seam. Furthermore, the present invention contemplates inserting a connecting wire in the seam during the process of construction of the tube and pinching the wire in position in the folds of the seam.

The means involved in the invention are hereinafter more fully set forth and claimed, reference being had to the accompanying drawing in which one form of the device is shown. In the drawing Fig. 1 is a view in elevation of the battery showing the tube in the folds of the seam in which the wire is introduced.

Figure 2:
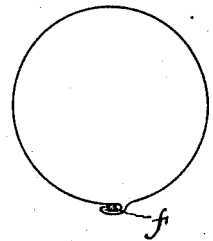

Fig. 2 is a view in section of the tube along the line 1—1 of Fig. 1.

Referring more in detail to the drawing, it will be seen that the metal band *a* has its edges folded over to form the seam *b* within the folds of which is clamped the wire *f*. With this construction, therefore, a good electrical connection is insured and the wire cannot become detached from the tube.

It will be seen, therefore, that I provide an effective means for securing the connection wire to the metallic tube that serves as a housing for the elements of a dry battery. This is accomplished by clamping the wire into the folds of the seam of the metallic element.

It will be understood that in view of the disclosure variations and modifications of the new device may be readily suggested, which may be carried out without departing from the spirit of the invention or from the scope of the claims herein.

What I claim as new and desire to secure by Letters Patent of the United States, is,—

1. In a battery, a metallic tube having two of its edges folded over each other to form a seam and a connection wire held between the folds of the seam thereby insuring an electric connection between the wire and the metal.

2. In a battery, a metallic tube serving as an electrode and having sections of the metal folded over each other to form a seam and a connection wire held between the folds of the seam thereby insuring an electric connection between the wire and the metal.

In witness whereof, I have hereunto set my hand this 28th day of July, 1924.

MARCEL VERRON.